United States Patent
Lin et al.

(10) Patent No.: US 7,715,513 B2
(45) Date of Patent: May 11, 2010

(54) DATA SYNCHRONIZATION APPARATUS

(75) Inventors: Jung-Tai Lin, Taichung (TW); Jing-Jo Bei, Chiayi (TW); Wu-Lin Chang, Changhua (TW)

(73) Assignee: Alpha Imaging Technology Corp., Hsinchu (TW)

( * ) Notice: Subject to any disclaimer, the term of this patent is extended or adjusted under 35 U.S.C. 154(b) by 813 days.

(21) Appl. No.: 11/558,457

(22) Filed: Nov. 10, 2006

(65) Prior Publication Data

US 2008/0112523 A1    May 15, 2008

(51) Int. Cl.
*H04L 7/00* (2006.01)
(52) U.S. Cl. .................. 375/372; 375/376
(58) Field of Classification Search ............ 375/354, 375/355, 371, 372, 373, 376
See application file for complete search history.

(56) References Cited

U.S. PATENT DOCUMENTS

| | | | | |
|---|---|---|---|---|
| 5,526,362 | A * | 6/1996 | Thompson et al. | 370/516 |
| 6,581,164 | B1 * | 6/2003 | Felts et al. | 713/400 |
| 7,526,427 | B2 * | 4/2009 | Kovacevic | 704/201 |
| 2003/0235261 | A1 * | 12/2003 | Patana | 375/376 |

* cited by examiner

*Primary Examiner*—David B Lugo
(74) *Attorney, Agent, or Firm*—Jianq Chyun IP Office

(57) ABSTRACT

A data synchronization apparatus is provided. The data synchronization apparatus comprises a first-in first-out buffer (FIFO buffer), a control circuit and a phase-locked loop (PLL). The FIFO buffer receives and stores a plurality of data and provides a FIFO adjustment signal according to the number of the data stored in the FIFO buffer. The data stored in the FIFO buffer are sent out to an external device at a clock rate derived from a master clock signal. The control circuit provides a PLL adjustment signal according to the FIFO adjustment signal. The PLL provides the master clock signal and adjusts the frequency of the master clock signal in response to the PLL adjustment signal.

19 Claims, 1 Drawing Sheet

DATA SYNCHRONIZATION APPARATUS

BACKGROUND OF THE INVENTION

1. Field of the Invention

The present invention relates to a data synchronization apparatus. More particularly, the present invention relates to a data synchronization apparatus for relaying data.

2. Description of the Related Art

The problem of flow control is always present when a data producer transmits data to a data consumer. Take a digital audio application for example. A digital-to-analog converter (DAC) receives audio data from a data source for further processing. In this scenario, the data source is the producer and the DAC is the consumer. The data source transmits data using a universal serial bus (USB) interface, while the DAC receives data through an integrated interchip sound ($I^2S$) interface. The problem is that the DAC cannot control the transmission rate of the data source, and ideally the receiving rate of the $I^2S$ interface should match the transmission rate of the USB interface. A conventional solution is using a phase-locked loop (PLL) to provide the clock signal of the $I^2S$ interface according to the transmission rate of the USB interface so that the receiving rate of the DAC matches the transmission rate of the data source.

However, this solution cannot solve every issue. Sometimes data are temporarily unavailable due to transmission loss or error. For the analog performance of the DAC, the data supply to the DAC should not be interrupted. In this case, the receiving rate of the DAC should not simply match with the transmission rate of the data source. The proper response is slowing down the receiving rate of the DAC until such a data underflow passes away. There is also the problem of data overflow. When the data source provides data faster than the DAC receives data, the receiving rate of the DAC has to increase accordingly. For an acceptable audio quality, the adjustment of the receiving rate must be gradual and steady. PLL alone cannot achieve these objectives. Therefore it is desirable to have an advanced solution for these issues.

SUMMARY OF THE INVENTION

Accordingly, the present invention is directed to a data synchronization apparatus. The apparatus provides a master clock signal to control the receiving rate of the data consumer. The apparatus adjusts the frequency of the master clock signal so that the receiving rate of the data consumer matches with the transmission rate of the data producer. Moreover, the apparatus is capable of adjusting the frequency of the master clock signal to prevent data underflow and overflow.

According to an embodiment of the present invention, a data synchronization apparatus is provided. The data synchronization apparatus comprises a first-in first-out buffer (FIFO buffer), a control circuit and a PLL. The FIFO buffer receives and stores a plurality of data and provides a FIFO adjustment signal according to the number of the data stored in the FIFO buffer. The data stored in the FIFO buffer are sent out to an external device at a clock rate derived from a master clock signal. The control circuit provides a PLL adjustment signal according to the FIFO adjustment signal. The PLL provides the master clock signal and adjusts the frequency of the master clock signal in response to the PLL adjustment signal.

In some embodiments of the present invention, the FIFO adjustment signal has a first state and a second state. The first state requests the PLL to increase the frequency of the master clock signal, while the second state requests the PLL to decrease the frequency of the master clock signal. The FIFO adjustment signal is in the first state when the number of the data stored in the FIFO buffer is greater than a high threshold value. The FIFO adjustment signal is in the second state when the number of the data stored in the FIFO buffer is less than a low threshold value. The high threshold value and the low threshold value are defined based on the total depth of the FIFO buffer.

In some embodiments of the present invention, the control circuit increases the frequency of the master clock signal through the PLL adjustment signal when the FIFO adjustment signal is in the first state. The control circuit decreases the frequency of the master clock signal through the PLL adjustment signal when the FIFO adjustment signal is in the second state.

In some embodiments of the present invention, the data synchronization apparatus further comprises a frequency counter. The frequency counter receives the master clock signal and a timer tick signal, counts the number of cycles of the master clock signal in a cycle of the timer tick signal, and then provides a counter adjustment signal according to the number of the counting. Moreover, the control circuit provides the PLL adjustment signal according to the FIFO adjustment signal and the counter adjustment signal.

In some embodiments of the present invention, the counter adjustment signal has a third state and a fourth state. The third state requests the PLL to increase the frequency of the master clock signal, while the fourth state requests the PLL to decrease the frequency of the master clock signal. The counter adjustment signal is in the third state when the number of the counting is less than a predetermined value, while the counter adjustment signal is in the fourth state when the number of the counting is greater than the predetermined value.

In some embodiments of the present invention, the FIFO adjustment signal is prior to the counter adjustment signal when the requests of the two adjustment signals contradict.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
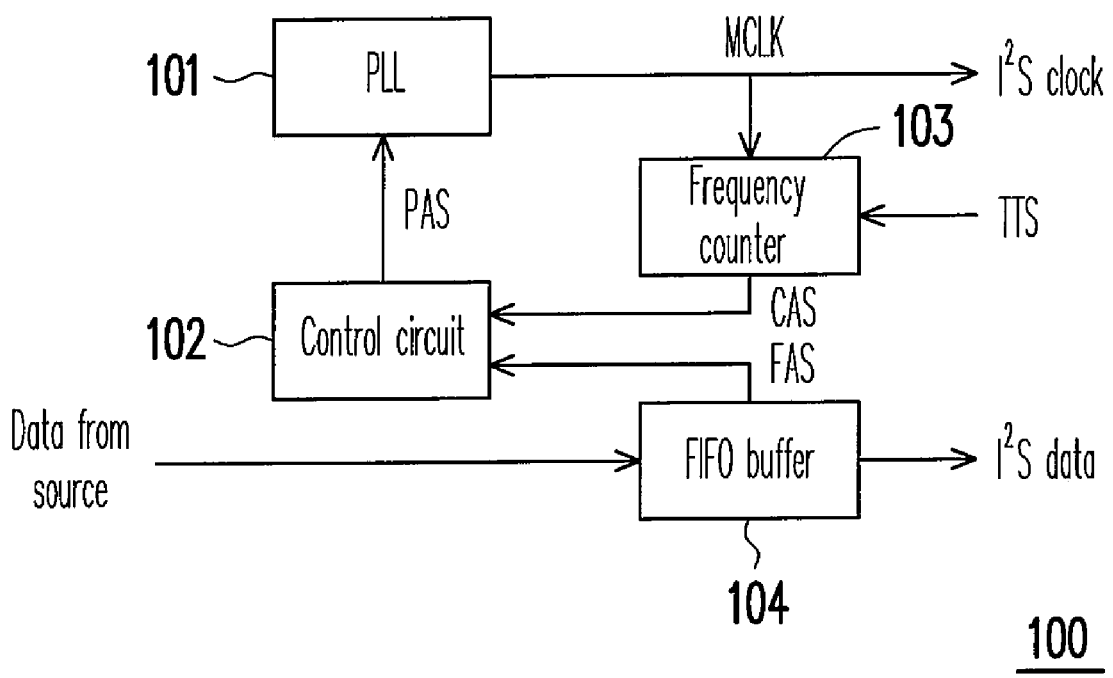
FIG. 1 is a schematic block diagram showing the data synchronization apparatus according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic block diagram showing the data synchronization apparatus 100 according to an embodiment of the present invention. Apparatus 100 comprises a PLL 101, a control circuit 102, a frequency counter 103 and a FIFO buffer 104. The PLL 101 provides the master clock signal MCLK and adjusts the frequency of the master clock signal MCLK in response to the PLL adjustment signal PAS. The control circuit 102 provides the PLL adjustment signal PAS according to the counter adjustment signal CAS and the FIFO adjustment signal FAS. The frequency counter 103 receives the master clock signal MCLK and the timer tick signal TTS.

Furthermore, the frequency counter 103 counts the number of cycles of the master clock signal MCLK in each cycle of the timer tick signal TTS and then provides the counter adjustment signal CAS according to the number of the counting. The FIFO buffer 104 receives and stores a plurality of data from the data source (not shown) and then provides the FIFO adjustment signal FAS according to the number of the data stored in the FIFO buffer 104. The data stored in the FIFO buffer 104 are later sent out to an external device (not shown) at a clock rate derived from the master clock signal MCLK.

In this embodiment, the data source is the data producer and the external device is the data consumer. The FIFO buffer 104 and the external device are coupled by an $I^2S$ interface. The master clock signal MCLK serves as the clock source of the $I^2S$ interface. The external device may be a DAC. It is obvious that the receiving rate of the external device is directly proportional to the frequency of the master clock signal MCLK. The purpose of the data synchronization apparatus 100 is controlling the frequency of the master clock signal MCLK according to the data flow from the data source in order to match the transmission rate of the data source with the receiving rate of the external apparatus and to prevent the problems of data underflow and overflow.

The timer tick signal TTS is a representative signal whose frequency is directly proportional to the transmission rate of the data source. For example, the data source may deliver data to the FIFO buffer 104 through a USB interface, and the timer tick signal TTS may be the start-of-frame (SOF) signal of the USB standard. The frequency counter 103 counts the number of cycles of the master clock signal MCLK in each cycle of the timer tick signal TTS and then compares the number of the counting with a predetermined ideal value. If the number of the counting is greater than the predetermined value, the master clock signal MCLK is too fast and has to be slowed down. If the number of the counting is less than the predetermined value, the master clock signal MCLK is too slow and has to be faster.

For example, the transmission rate of the data source may be 24.576 MHz. Ideally the frequency of the master clock signal MCLK should be the same. The period of the timer tick signal TTS may be one millisecond. It follows that there should be 24576 cycles of the master clock signal MCLK in each cycle of the timer tick signal TTS. Therefore the predetermined value of the frequency counter 103 is 24576. If the counting number of the frequency counter 103 is greater than 24576, the frequency of the master clock signal MCLK has to be decreased. If the counting number of the frequency counter 103 is less than 24576, the frequency of the master clock signal MCLK has to be increased. By matching the frequency of the master clock signal MCLK with the frequency of the timer tick signal TTS in this way, the apparatus 100 matches the receiving rate of the external device with the transmission rate of the data source as a result. It is preferred to reset the counting of the frequency counter 103 when each cycle of the timer tick signal TTS begins, thus counting error due to accidental loss of timer ticks does not accumulate.

The interface between the data source and the FIFO buffer 104 is not limited to USB. The interface between the FIFO buffer 104 and the external device is not limited to $I^2S$. For example, the data source may deliver data to the FIFO buffer 104 through an RF signal of a digital audio broadcasting (DAB) system. In such a scenario, the timer tick signal TTS may be the synchronization pattern of the DAB standard.

The counter adjustment signal CAS must be able to notify the control circuit 102 how to adjust the frequency of the master clock signal MCLK. In this embodiment, the counter adjustment signal CAS has two states. The counter adjustment signal CAS enters an increment state to request the PLL 101 to increase the frequency of the master clock signal MCLK when the number of the counting is less than the predetermined value. On the other hand, the counter adjustment signal CAS enters a decrement state to request the PLL 101 to decrease the frequency of the master clock signal MCLK when the number of the counting is greater than the predetermined value.

The FIFO adjustment signal FAS provided by the FIFO buffer 104 also has two states to notify the control circuit 102 how to adjust the frequency of the master clock signal MCLK. When the number of the data stored in the FIFO buffer 104 is greater than a predetermined high threshold value, data overflow is imminent and the FIFO adjustment signal FAS enters an increment state to request the PLL 101 to increase the frequency of the master clock signal MCLK. When the number of the data stored in the FIFO buffer 104 is less than a predetermined low threshold value, data underflow is imminent and the FIFO adjustment signal FAS enters a decrement state to request the PLL 101 to decrease the frequency of the master clock signal MCLK. The high threshold value and the low threshold value are defined based on the total depth of the FIFO buffer 104. In this way the data synchronization apparatus 100 can prevent data overflow and underflow.

The control circuit 102 increases the frequency of the master clock signal MCLK through the PLL adjustment signal PAS when the FIFO adjustment signal FAS is in the increment state, while the control circuit 102 decreases the frequency of the master clock signal MCLK through the PLL adjustment signal PAS when the FIFO adjustment signal FAS is in the decrement state. The same principles apply to the counter adjustment signal CAS as well. The control circuit 102 increases the frequency of the master clock signal MCLK through the PLL adjustment signal PAS when the counter adjustment signal CAS is in the increment state, while the control circuit 102 decreases the frequency of the master clock signal MCLK through the PLL adjustment signal PAS when the counter adjustment signal CAS is in the decrement state.

When the requests of the FIFO adjustment signal FAS and the counter adjustment signal CAS contradict, the control circuit 102 may act as an arbiter and provides the PLL adjustment signal PAS according to either the FIFO adjustment signal FAS or the counter adjustment signal CAS. In this case, one of the adjustment signals (FAS and CAS) must be prior to the other. Either data overflow or underflow causes data loss, which is unacceptable. Consequently the frequency of the master clock signal MCLK must be adjusted in response to the imminent danger of data overflow or underflow regardless of whether the PLL 101 has the frequency of the master clock signal MCLK locked to the transmission rate of the data source or not. Therefore the FIFO adjustment signal FAS is prior to the counter adjustment signal CAS in this embodiment.

The control circuit 102 may adjust the frequency of the master clock signal MCLK by adjusting the divider N of the feedback path of the PLL 101 through the PLL adjustment signal PAS. The frequency of the master clock signal MCLK increases as the divider N increases. For the analog performance of the external DAC, the frequency adjustment has to be gradual and smooth in order to avoid detection by human ears. In such applications, it is recommended that the PLL 101 is a fractional-N PLL.

Another way for the control circuit 102 to handle contradictory requests from the FIFO adjustment signal FAS and the counter adjustment signal CAS is to act as an adder or accumulator. The control circuit 102 may add a FIFO step value to the divider N when the FIFO adjustment signal FAS is in the increment state and subtract the FIFO step value from the divider N when the FIFO adjustment signal FAS is in the decrement state. The control circuit 102 may also add a counter step value to the divider N when the counter adjustment signal CAS is in the increment state and subtract the counter step value from the divider N when the counter adjustment signal CAS is in the decrement state. The FIFO step value is greater than the counter step value because the FIFO adjustment signal FAS is prior to the counter adjustment signal CAS. In this way the requests from these two adjustment signals accumulate to promote a faster frequency adjustment when the requests are concordant. On the other hand, there is still a frequency adjustment, although in a slower pace, when the requests of the adjustment signals FAS and CAS contradict.

Small step values can be adopted when fine-grained frequency adjustment of the master clock signal MCLK is preferred. For example, the least significant bit (LSB) of the divider N may be used as the unit of adjustment. The FIFO step value may be two LSB units and the counter step value may be one LSB unit.

In summary, the data synchronization apparatus 100 in this embodiment uses the frequency counter 103 to match the receiving rate of the external device with the transmission rate of the data source. The apparatus 100 also uses the FIFO buffer 104 to prevent data overflow and underflow. Therefore the apparatus 100 in this embodiment is an advanced solution which overcomes the issues of the conventional solution.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data synchronization apparatus, comprising:
   a FIFO buffer for receiving and storing a plurality of data and providing a FIFO adjustment signal according to the number of the data stored in the FIFO buffer, wherein the data stored in the FIFO buffer are sent out to an external device at a clock rate derived from a master clock signal;
   a frequency counter for receiving the master clock signal and a timer tick signal, counting the number of cycles of the master clock signal in a cycle of the timer tick signal, and providing a counter adjustment signal according to the number of the counting;
   a control circuit for providing a PLL adjustment signal according to the FIFO adjustment signal and the counter adjustment signal; and
   a PLL for providing the master clock signal and adjusting the frequency of the master clock signal in response to the PLL adjustment signal.

2. The data synchronization apparatus of claim 1, wherein the FIFO adjustment signal has a first state and a second state, the first state requests the PLL to increase the frequency of the master clock signal, the second state requests the PLL to decrease the frequency of the master clock signal.

3. The data synchronization apparatus of claim 2, wherein the FIFO adjustment signal is in the first state when the number of the data stored in the FIFO buffer is greater than a high threshold value, the FIFO adjustment signal is in the second state when the number of the data stored in the FIFO buffer is less than a low threshold value, the high threshold value and the low threshold value are defined based on the total depth of the FIFO buffer.

4. The data synchronization apparatus of claim 2, wherein the control circuit increases the frequency of the master clock signal through the PLL adjustment signal when the FIFO adjustment signal is in the first state, the control circuit decreases the frequency of the master clock signal through the PLL adjustment signal when the FIFO adjustment signal is in the second state.

5. The data synchronization apparatus of claim 1, wherein the FIFO buffer and the external device are coupled by an $I^2S$ interface, and the master clock signal is the clock source of the $I^2S$ interface.

6. The data synchronization apparatus of claim 1, wherein the PLL is a fractional-N PLL.

7. The data synchronization apparatus of claim 1, wherein the frequency counter resets the counting when each cycle of the timer tick signal begins.

8. The data synchronization apparatus of claim 1, wherein the data are delivered to the FIFO buffer through a USB interface.

9. The data synchronization apparatus of claim 8, wherein the timer tick signal is the SOF signal of the USB standard.

10. The data synchronization apparatus of claim 1, wherein the data are delivered to the FIFO buffer in an RF signal of a DAB system.

11. The data synchronization apparatus of claim 10, wherein the timer tick signal is a synchronization pattern of the DAB standard.

12. The data synchronization apparatus of claim 1, wherein the counter adjustment signal has a third state and a fourth state, the third state requests the PLL to increase the frequency of the master clock signal, the fourth state requests the PLL to decrease the frequency of the master clock signal.

13. The data synchronization apparatus of claim 12, wherein the counter adjustment signal is in the third state when the number of the counting is less than a predetermined value, the counter adjustment signal is in the fourth state when the number of the counting is greater than the predetermined value.

14. The data synchronization apparatus of claim 12, wherein the FIFO adjustment signal has a first state and a second state, the first state requests the PLL to increase the frequency of the master clock signal, the second state requests the PLL to decrease the frequency of the master clock signal.

15. The data synchronization apparatus of claim 14, wherein the control circuit provides the PLL adjustment signal according to either the FIFO adjustment signal or the counter adjustment signal when the requests of the FIFO adjustment signal and the counter adjustment signal contradict.

16. The data synchronization apparatus of claim 15, wherein the FIFO adjustment signal is prior to the counter adjustment signal.

17. The data synchronization apparatus of claim 14, wherein the control circuit adjusts the frequency of the master clock signal by adjusting the divider of the PLL through the PLL adjustment signal.

18. The data synchronization apparatus of claim 17, wherein the control circuit adds a FIFO step value to the divider when the FIFO adjustment signal is in the first state, the control circuit subtracts the FIFO step value from the divider when the FIFO adjustment signal is in the second state, the control circuit adds a counter step value to the divider when the counter adjustment signal is in the third state, the control circuit subtracts the counter step value from the divider when the counter adjustment signal is in the fourth state.

19. The data synchronization apparatus of claim 18, wherein the FIFO step value is greater than the counter step value.

* * * * *